United States Patent [19]

Walling

[11] 4,336,415
[45] Jun. 22, 1982

[54] FLEXIBLE PRODUCTION TUBING

[76] Inventor: John B. Walling, 5613 Trail Lake Dr., Fort Worth, Tex. 76133

[21] Appl. No.: 170,610

[22] Filed: Jul. 21, 1980

Related U.S. Application Data

[63] Continuation-in-part of Ser. No. 150,615, May 16, 1980.

[51] Int. Cl.³ .............................................. F16L 11/12
[52] U.S. Cl. ..................................... 174/47; 138/111; 138/125; 138/137
[58] Field of Search ....................... 174/47, 70 R, 116; 138/111, 123, 124, 125, 129, 137, 172, 174; 166/65 R, 242

[56] References Cited

U.S. PATENT DOCUMENTS

| | | | |
|---|---|---|---|
| 2,748,358 | 5/1956 | Johnston | 174/47 X |
| 2,883,513 | 4/1959 | Schnabel | 174/47 X |
| 2,998,028 | 8/1961 | Rohde | 138/109 |
| 3,098,892 | 7/1963 | Spade et al. | 174/47 |
| 3,234,723 | 2/1966 | Brown | 174/47 X |
| 3,400,737 | 9/1968 | Matthews et al. | 174/47 X |
| 3,526,086 | 9/1970 | Morgan | 174/47 X |
| 3,780,208 | 12/1973 | Whittaker et al. | 174/47 |
| 3,784,785 | 1/1974 | Noland | 174/47 X |
| 3,807,502 | 4/1974 | Heilhecker et al. | 166/65 R X |
| 3,818,116 | 6/1974 | Kuljian | 174/47 X |
| 3,828,112 | 8/1974 | Johansen et al. | 174/47 |
| 3,856,052 | 12/1974 | Feucht | 138/172 X |
| 3,899,046 | 8/1975 | Hansen | 174/47 X |
| 3,899,631 | 8/1975 | Clark | 174/47 |
| 3,905,398 | 9/1975 | Johansen et al. | 138/124 |
| 3,988,188 | 10/1976 | Johansen et al. | 138/125 X |
| 4,024,913 | 5/1977 | Grable | 138/123 X |
| 4,064,601 | 12/1977 | Miyagishima | 174/47 X |
| 4,112,247 | 9/1978 | Dembiak et al. | 174/70 R X |
| 4,194,536 | 3/1980 | Stine et al. | 138/111 X |

FOREIGN PATENT DOCUMENTS

| | | | |
|---|---|---|---|
| 2142075 | 3/1973 | Fed. Rep. of Germany | 174/47 |
| 2838577 | 3/1979 | Fed. Rep. of Germany | 174/47 |

*Primary Examiner*—Laramie E. Askin
*Attorney, Agent, or Firm*—Dennis T. Griggs

[57] ABSTRACT

A composite, flexible tubing assembly (22) for conveying fluids along plural flow paths is provided by an integrated assembly of a relatively large diameter core tube (32) for conveying production fluid, electrical conductors (42, 44, 46, 48) and a plurality of relatively smaller diameter tubular conduits (38, 40) for conveying electrical power and/or pneumatic/hydraulic fluid to the drive motor of a downhole pump, respectively. High tensile strength is provided by a group (36A) of flexible strands (36) and a protective, high tensile strength polymer sheath (34) which encloses the core tube (32) and tubular conduits (38, 40). The assembly (22) is further strengthened by an injection body (58) of filler material disposed in the annulus intermediate the core tube (32) and the protective sheath (34). Tension loading of the production core tube (32) and of the pneumatic/hydraulic conduits (38, 40) is relieved by arranging the large diameter production core tube (32) along an undulating path through the protective outer sheath (34), with the relatively smaller diameter pneumatic/hydraulic tubular conduits (38, 40) and power conductors (42, 44, 46, 48) being wrapped around the production core tube (32).

2 Claims, 5 Drawing Figures

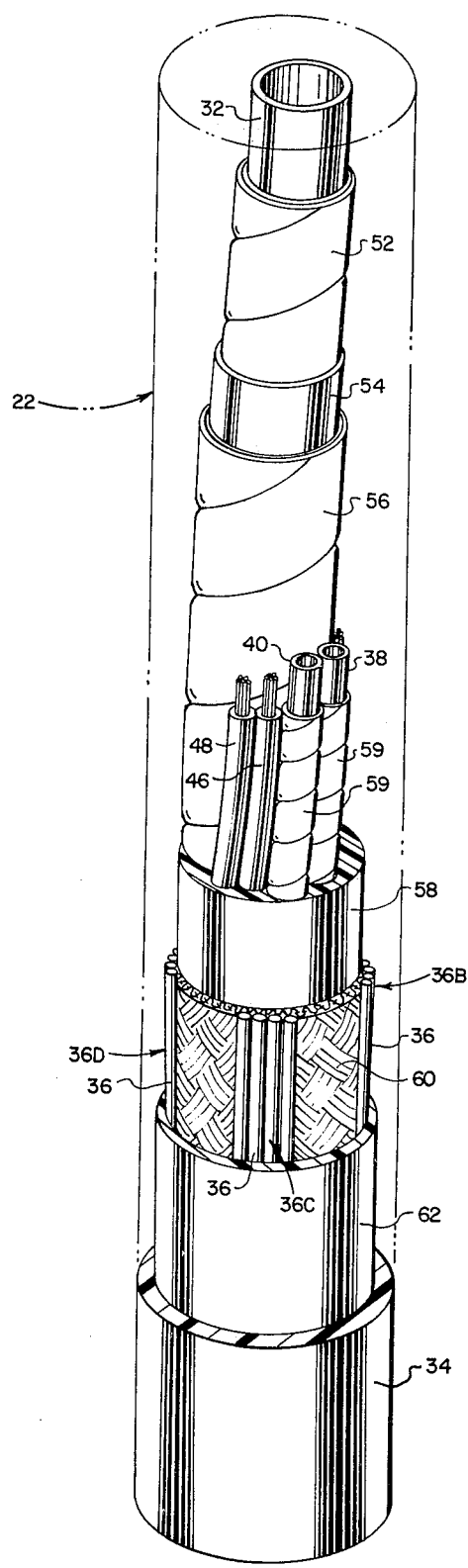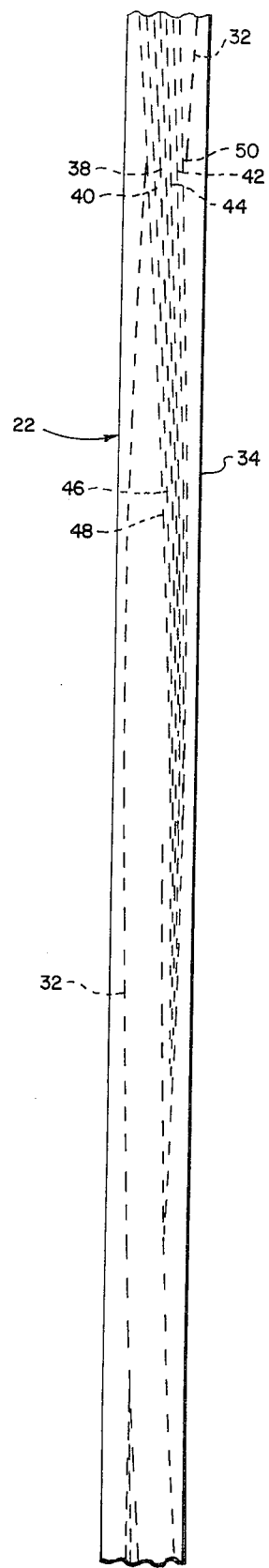
FIG. 4
FIG. 5

FLEXIBLE PRODUCTION TUBING

CROSS REFERENCE TO RELATED APPLICATION

This application is a continuation-in-part of Application Ser. No. 150,615, filed May 16, 1980.

BACKGROUND OF THE INVENTION

1. Field of the Invention

The present invention relates generally to well production equipment, and in particular to flexible production tubing in which a production conduit, power conductors, signal conductors and hydraulic/pneumatic conduits are integrated within a high tensile strength, flexible tubular assembly.

2. Description of the Prior Art

Various types of artificial lifts are used to bring liquids to the surface of the earth when the pressure of the liquid-bearing reservoir is insufficient to produce the liquids by natural means. The pumping motion of the artificial lift may originate at the surface of the ground, or below as a result of the application of electrical or fluid power to a subsurface pump. In the subsurface-powered rig, a vertically reciprocating pump element at the bottom of the well is actuated by the application of electrical or pneumatic/hydraulic power to a subsurface pump. In the surface-powered rig, a vertically reciprocating pump element at the bottom of the well is actuated by a walking beam pivotally mounted on a Sampson post and connected at one end to the sucker rod string and at the other end to a prime mover which supplies power through a Pittman gear for producing the reciprocating motion of the sucker rod string.

Generally, the prime mover consists of an internal combustion engine or electric motor. The cost of this prime mover, as well as its operation and maintenance, is, in many instances, a significant economic factor in the production of liquids from subterranean liquid-bearing reservoirs. The sucker rods are characterized by a short, fast stroke, resulting in low pump efficiency, high power consumption and low recovery rates. Additionally, the steel production rod tubing is subject to failure and must be repaired or replaced at substantial expense from time to time.

An additional limitation of surface-powered rigs which operate a sucker rod through rigid production tubing is that, for practical purposes, the weight of the sucker rod for wells having a producing formation at about ten thousand feet or deeper is excessive, resulting in stretching and early failure of the rods. Moreover, the sucker rod assembly is subject to severe wear in slant-hole or crooked-hole wells. In slant-hole wells, of the type typically drilled offshore, the sucker rod is subjected to severe frictional wear because of the slant of the hole, and is therefore subject to early failure and requires frequent replacement. Frictional wear is also a serious problem in crooked holes in which the well bore follows a helical path. Because of the difficulty of drilling a substantially vertical well at other than shallow depth, effective use of the sucker rod assembly is substantially limited to shallow wells.

For the foregoing reasons, there has been considerable interest in improving pumping systems in which the motive force is provided by electrical or pneumatic/hydraulic power applied to a subsurface pump, thereby eliminating the sucker rods and affording precise control of the pumping action.

Submersible pumps of the type in which the pumping force is derived from electrical, hydraulic, or pneumatic power applied down hole represent a significant improvement over the reciprocating sucker rod approach. According to conventional practice, the submersible pump which is driven down hole by an electrical, hydraulic or pneumatic driving means is supported at the end of a long string of rigid production tubing joints which are coupled to each other by pin and box connections. Power conductors, signal conductors and hydraulic/pneumatic conduits are bundled together in an external umbilical cable assembly and are secured to the rigid production tubing joints, and are coupled to the down hole pump.

Although steel production tubing has great strength and durability, it requires a substantial capital investment. The procedure of running rigid sections of production tubing into and out of the well bore is complicated by the external umbilical cable assembly. Moreover, the steel production tubing, as well as the pump, is subject to corrosion so that it may be necessary to pull the production tubing from the casing and repair the pump or replace damaged production tubing sections from time to time. When such workover operations become necessary, a portable installation called a workover rig must be brought to the well site and set up. Generally, these rigs consist of a heavy derrick or mast which support block and tackle arrangements that are operable to pull the pipe string from the well. The workover rigs are usually heavy and difficult to erect and must be capable of lifting the substantial load imposed by the rigid pipestring.

An overriding concern in the operation of a producing well is to get the necessary equipment into and out of the well as rapidly and safely as is economically possible. The efficiency of the pipe-handling operations is limited by such factors as the running speed of the hoist rig, the time required to make up or break and tool joint during stabbing operations, the time required to mechanically couple and decouple the hoist rig and the pipe string, and the time required to transport a length of pipe from the pipe string to a storage station during recovery operations and to transport a length of pipe from the storage station to the pipe string during launching operations. As the length of the pipe string increases to reach the producing formation of deep wells, the pipe handling equipment must safely support the large load of the pipe string and permit the efficient execution of launching and recovery operations while preserving the structural integrity of the pipe string during the handling operations.

It will be appreciated that the substantial capital expenditure required for rigid, steel production tubing, and the expense associated with launching, recovering, and repair or replacement of the steel production tubing make its use prohibitive in low production wells, and accounts for a substantial percentage of the overall production costs of other wells.

OBJECTS OF THE INVENTION

It is, therefore, the principal object of the present invention to provide flexible production tubing in which the rigid production tubing and sucker rods are totally eliminated and are replaced by flexible tubing in which a flexible production conduit, power conductors, signal conductors and hydraulic/pneumatic conduits are enclosed within a flexible tubular covering.

A related object of the invention is to provide a flexible production tubing which is capable of conveying fluids along plural flow paths while withstanding substantial tension loading.

Yet another object of the invention is to provide flexible production tubing which is adapted for down hole use in the presence of adverse pressure/temperature conditions and corrosive formation fluid.

Another object of the invention is to provide relatively lightweight, high tensile strength flexible production tubing which can be transported on a reel and which can be launched and recovered into and out of a well bore without the assistance of pipe-handling hoist rigs.

An important object of the invention is to provide a composite, flexible tubing assembly for conveying fluids along plural flow paths in an integrated, flexible assembly of a flexible production conduit, hydraulic/pneumatic conduits, power conductors and signal conductors, which are enclosed within a flexible tubular convering, which completely replace the rigid production tubing and sucker rods, and which can be used at relatively great depths in both slant holes and in crooked holes.

Still another object of the invention is to provide an integrated flexible production tubing assembly which includes power conductors, signal conductors and hydraulic/pneumatic conduits, as well as a production conduit, wherein the flexible assembly can withstand substantial tension loading without pinching or otherwise restricting fluid flow through the plural flow paths defined by the production conduit and the hydraulic/pneumatic power conduits.

SUMMARY OF THE INVENTION

The present invention is embodied in a flexible well production tubing of the type including a tubular outer sidewall covering, a tubular production conduit enclosed within the outer sidewall covering and a sheath of flexible, high tensile strength strands interposed between the outer sidewall covering and the production conduit. Rigid production tubing and sucker rods are totally eliminated and are replaced by flexible production tubing in which a flexible production conduit, power conductors, signal conductors, and hydraulic/pneumatic conduits are enclosed within a flexible, high tensile strength tubular covering. The flexible production tubing is coupled to a submersible pump which includes driving means such as an electrical motor, hydraulic motor or pneumatic motor which is driven down hole by electrical or hydraulic/pneumatic power which is transmitted through auxillary conduits of the flexible production tubing assembly.

The flexible production tubing is wound about a reel for easy and convenient transport to and from a well site. A submersible pump is attached directly to the end of the flexible tubing and is lowered through the well casing to the producing formation. The weight of the submersible pump, which may amount to several hundred pounds, pulls the flexible tubing through the well without the requirement of snubbing. Withdrawal of the pump and flexible line from the well is easily accomplished without pipe string hoist equipment by rewinding the flexible production tubing around the reel.

It will be appreciated that, because of the weight of the submersible pump, the flexible tubing must withstand substantial tension loading. Additionally, although it is unlikely to occur, the downhole equipment can, in some instances, become snagged on a surface irregularity of the well casing so that the flexible tubing must be able to withstand substantial impulse loading as the equipment is withdrawn from the well. Moreover, because of the downhole pressures, temperatures, and the presence of corrosive formation fluids, the tubing assembly must not only be mechanically stable, but also must be sealed against exposure to the corrosive formation fluid.

A composite, flexible tubing assembly for conveying fluids along plural flow paths is provided by an integrated assembly of a relatively large diameter core tube for conveying production fluid, and a plurality of relatively smaller diameter tubular conduits for conveying pneumatic/hydraulic fluid to the drive motor of the pump. High tensile strength is provided by a group of high tensile strength, flexible strands and a protective, high tensile strength polymer sheath which encloses the core tube and tubular conduits. The assembly is further strengthened by an injection body of filler material disposed in the annulus intermediate the core tube and the flexible strand group. The injection body of filler material improves the burst rating of the assembly, and also prevents pinching of the production core tube and of the pneumatic/hydraulic conduits.

Tension loading applied to the flexible tubing assembly is absorbed in substantial part by the outer protective polymer sheath and by the group of high tensile strength strands. According to a preferred embodiment, tension loading of the production core tube and of the pneumatic/hydraulic conduits is relieved by arranging the large diameter production core tube along a helical or undulating path through the protective outer sheath, with the relatively smaller diameter pneumatic/hydraulic tubular conduits and power conductors, if any, being would in helical or spiral wrap relation around the production core tube. The pitch of the production core tube and the pitch of the helical or spiral path followed by the pneumatic/hydraulic conduits is preferably very slight. For example, a length of production tubing of seven thousand feet will typically enclose approximately eight thousand feet of production conduit. The flexible, load-bearing strands are preferably divided in four groups of four each, with the groups being symmetrically spaced with respect to each other, and extending axially in parallel relation with respect to the longitudinal axis of the tubing assembly.

The novel features which characterize the invention are defined by the appended claims. The foregoing and other objects, advantages and features of the invention will hereinafter appear, and for purposes of illustration of the invention, but not of limitation, exemplary embodiments of the invention are shown in the appended drawings.

BRIEF DESCRIPTION OF THE DRAWINGS

FIG. 4 is a step-wise, cutaway perspective view of the flexible production tubing; and FIG. 5 is a side elevation view of the flexible production tubing assembly which illustrates the pitch of the production core tube and the pneumatic/hydraulic conduits of the assembly.

DESCRIPTION OF THE PREFERRED EMBODIMENTS

Figure 1:
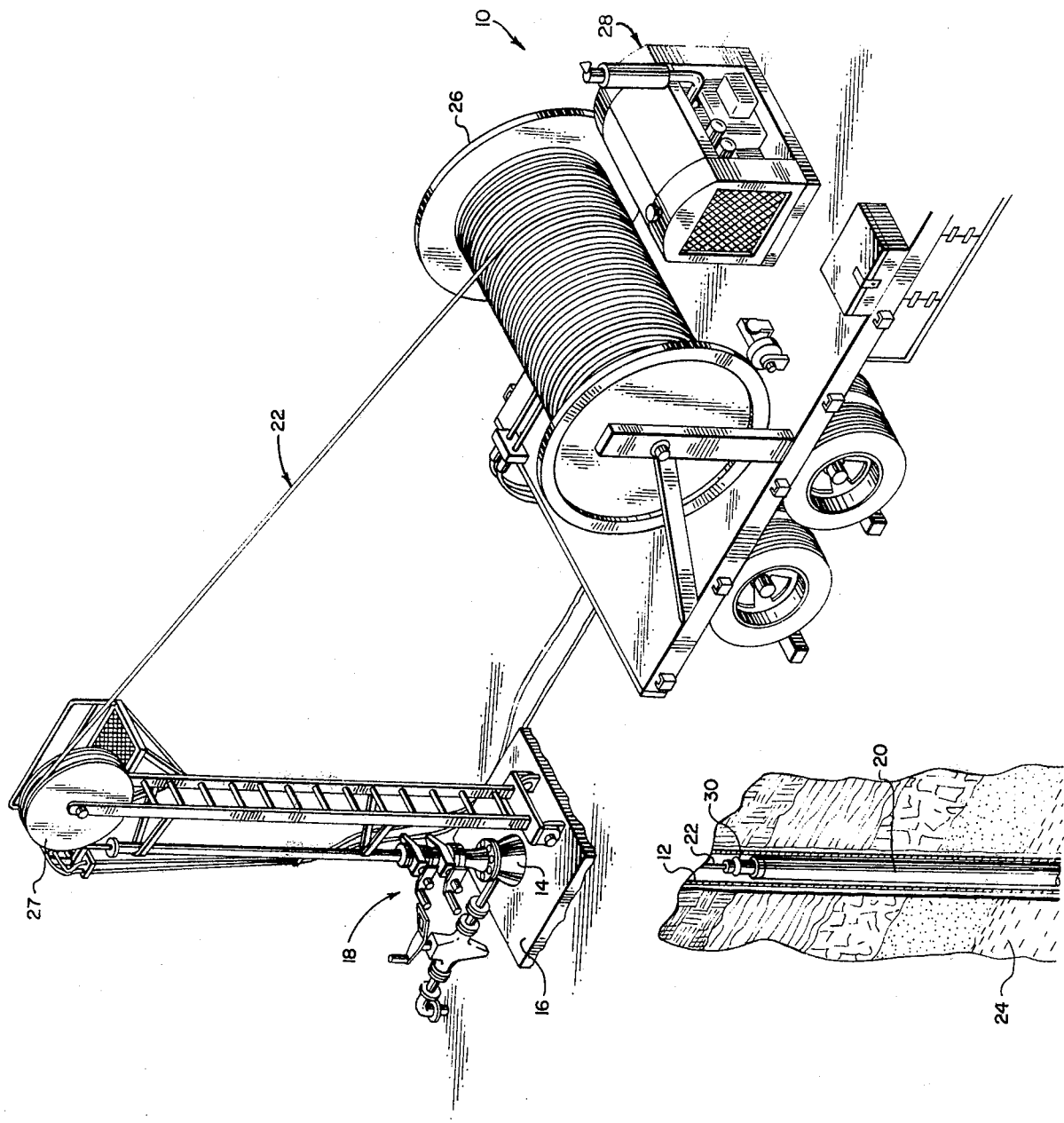
FIG. 1 is a perspective view which illustrates the installation of a submersible pump in a well bore in which the submersible pump is supported by a length of flexible production tubing.

In the description which follows, like parts are marked throughout the specification and drawings with the same reference numerals, respectively. The drawings are not necessarily to scale, and, in some instances, portions have been exaggerated in order to more clearly depict certain features of the invention.

Referring now to FIG. 1, a pump installation rig (10) is set up adjacent a well site in which a well casing (12) is terminated by a lower well head flange (14) and is anchored in a concrete block (16) in the usual manner. A slip and packer assembly (18) extends above the lower flange (14). Extending through the slip assembly and into the well casing (12) is a submersible pump (20) which is supported by a length of flexible production tubing (22) for recovering fluids and minerals from a producing formation (24). The pump (20) is lowered and retracted through the well casing (12) as the flexible tubing (22) is played out and taken up by a reel (26) and by a hydraulically-powered bull wheel (27) according to the control signals generated at an operator console power station (26). The flexible production tubing (22) is attached to the end of the pump housing (20) by means of a connector assembly (30).

Figure 2:
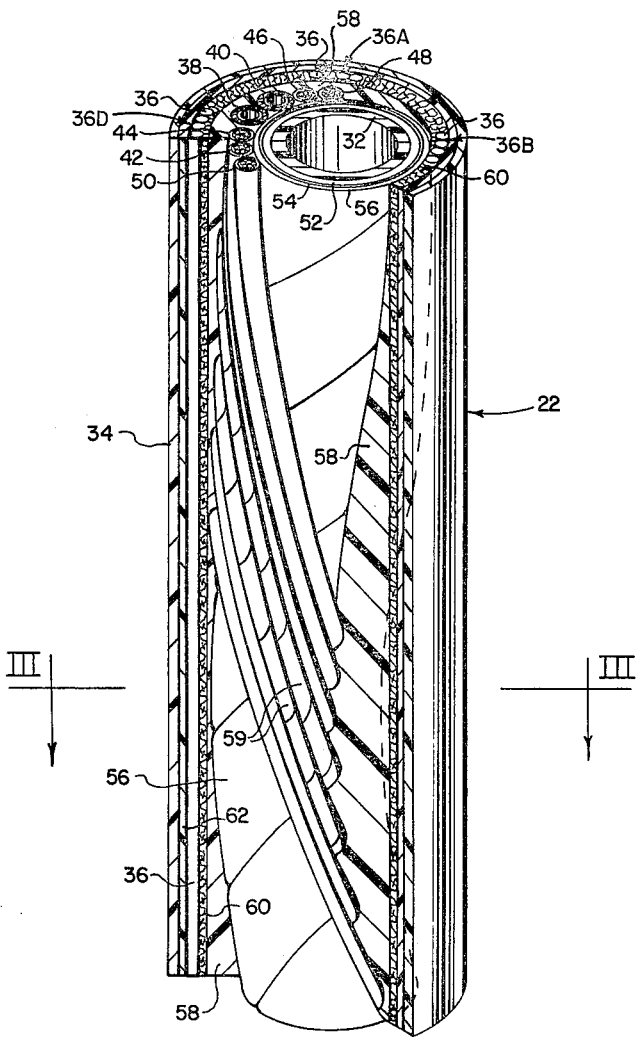
FIG. 2 is a perspective view, partly broken away, of a section of flexible production tubing.
Figure 3:
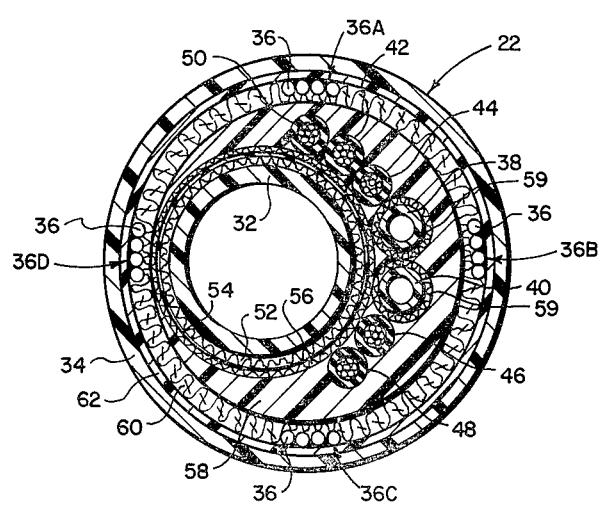
FIG. 3 is a sectional view of the flexible production tubing taken along the lines III—III of FIG. 2.

Referring now to FIGS. 2 and 3, the flexible production tubing (22) includes a flexible production core conduit (32) enclosed within a flexible, high tensile strength tubular outer sheath (34) and four groups (36A, 36B, 36C, 36D) of flexible, high tensile strength strands (36). The outer sheath (34) preferably comprises a high strength durable material such as nylon or Teflon. Teflon is preferred for high temperature, corrosive environment usage. The load-bearing, high tensile strength strands (36) which comprise each group are preferably a synthetic fibrous material such as aromatic polyimide, sold under the trademark of Nomex or Kevlar by E. I. Dupont DeNemours. The flexible, load-bearing strands (36) extend axially along the length of the tubing assembly and are located intermediate the outer protective, load-bearing sheath (34) and the core production conduit (32).

Disposed in spiral or helical wrap relation around the production core tube (32) are a plurality of pneumatic/hydraulic conduits (38, 40) and a number of power conductors (42, 44, 46 and 48), and a signal conductor bundle (50). It should be understood that, in the trade, it is customary to use the expression "spiral wrap" when referring to this type of wrapped assembly, which, strictly speaking, is one of helical wrapping. Insofar as the production core tube (32) is generally cylindrical, the wrap will be helical, and insofar as it is tapered, the wrap will be spiral.

Disposed intermediate the core conduit (32) and the wrapped array of power conductors and pneumatic/hydraulic conduits, are a first wrap of a polyester ribbon material (52), which is received within a nylon sheath (54), and a second layer (56) of polyester ribbon, which is wrapped in a partially convoluted, spiral path about the nylon sheath (54). The power conductors (42, 44, 46, 48) and pneumatic/hydraulic conduits (38, 40) are stabilized against the wrapped core conduit (32) by an injection body (58) of polyester filler material which is injected into the annulus surrounding the wrapped core conduit (32) under the application of heat and pressure. In addition to improving burst strength, the injection body (58) shields the core conduit (32) and the pneumatic/hydraulic conduits (38, 40) with respect to shear forces which would pinch or otherwise restrict flow through the conduits. The pneumatic/hydraulic conduits (38, 40) are wrapped with a layer (59) of a polyester ribbon material to improve burst strength.

Immediately surrounding the injection body (58) is a braided sheath (60) of polyester fiber strands which further improves the burst strength of the assembly. The braided sheath (60) is encased within a relatively thin-gauged nylon sheath (62) which is in turn encased within the relatively heavy-gauge, high tensile strength nylon sheath (34). The Kevlar strands (36) are preferably interwoven or otherwise bonded, for example by an adhesive deposit, to the braided sheath (60).

Referring now to FIGS. 2, 4 and 5, it will be seen that the production core conduit (32) is disposed along a helical or undulating path, and that the power conductors and pneumatic/hydraulic conduits are wrapped in a helical or spiral path around the core conduit (32). According to this arrangement, tension loads imposed upon the flexible tubing assembly will be applied to the outer sheath (34) and the Kevlar strands (36). Incidental tension loading of the core conduit (32) and of the power conductors and pneumatic/hydraulic conduits is relieved because of the relatively greater tubing length of the inner components as compared with the length of the outer sheath (34) and Kevlar strands (36).

Although a preferred embodiment of the invention has been described in detail, it should be understood that various changes, substitutions, and alterations can be made therein without departing from the spirit and scope of the invention as defined by the appended claims.

What is claimed is:

1. Flexible production tubing comprising, in combination:
    a protective, high tensile strength tubular sheath;
    a relatively large diameter core tube extending along an undulating path through said protective sheath; and,
    a complementary injection body of load-bearing filler material disposed in the annulus intermediate said undulating core tube and said protective sheath, said core tube being at least partially embedded within the injection body, said injection body yieldably supporting said core tube along said undulating path.

2. A flexible, load bearing production tubing assembly for mechanically supporting a pump in a well bore, and for conveying pneumatic/hydraulic or electrical power to the pump while simultaneously conveying production fluid from a producing formation to a surface facility, comprising:
    a protective, high tensile strength tubular sheath of polymeric material;
    a flexible production tube for conveying formation fluid extending along an undulating path through said protective sheath;
    a plurality of relatively smaller diameter, flexible tubular pneumatic/hydraulic conduits disposed in spiral wrap relation about said production tube;
    a plurality of flexible, insulated electrical conductors disposed in spiral wrap relation about said production tube;

a complementary injection body of load-bearing filler material disposed in the annulus intermediate said undulating production tube and said protective sheath, said pneumatic/hydraulic tubular conduits, electrical conductors and production tube being at least partially embedded within said injection body, said injection body shielding said conduits with respect to shear forces which would pinch or otherwise restrict flow in said conduits and yieldably restraining said conduits against movement relative to said sheath; and, a group of high tensile strength, flexible strands extending longitudinally intermediate said injection body and said protective sheath.

* * * * *